United States Patent
Ritland

(10) Patent No.: US 7,246,480 B2
(45) Date of Patent: Jul. 24, 2007

(54) SYSTEM FOR HEATING AN AIR INTAKE OF TURBINE ENGINE

(75) Inventor: Paul David Ritland, Longwood, FL (US)

(73) Assignee: Siemens Power Generation, Inc., Orlando, FL (US)

( * ) Notice: Subject to any disclaimer, the term of this patent is extended or adjusted under 35 U.S.C. 154(b) by 224 days.

(21) Appl. No.: 10/981,289

(22) Filed: Nov. 4, 2004

(65) Prior Publication Data
US 2006/0090472 A1    May 4, 2006

(51) Int. Cl.
*F02C 7/047*    (2006.01)
(52) U.S. Cl. .................. 60/39.093; 244/134 R
(58) Field of Classification Search ............ 60/39.093; 244/134 R, 134 D; 415/177
See application file for complete search history.

(56) References Cited

U.S. PATENT DOCUMENTS

| | | | |
|---|---|---|---|
| 2,655,308 A * | 10/1953 | Luttman | ..................... 415/177 |
| 2,680,345 A * | 6/1954 | Frost | ....................... 60/39.093 |
| 3,834,157 A | 9/1974 | Hoffmann | |
| 3,925,979 A | 12/1975 | Ziegler | |
| 4,550,564 A | 11/1985 | Callahan et al. | |
| 4,782,658 A | 11/1988 | Perry | |
| 4,821,758 A | 4/1989 | Ruis | |
| 5,281,091 A | 1/1994 | Dooley et al. | |
| 5,657,951 A | 8/1997 | Giamati | |
| 5,934,617 A | 8/1999 | Rutherford | |
| 6,233,917 B1 | 5/2001 | Bähr et al. | |
| 6,725,645 B1 | 4/2004 | Wadia et al. | |

FOREIGN PATENT DOCUMENTS

| | | |
|---|---|---|
| EP | 0 596 062 B1 | 5/1994 |
| EP | 0 678 160 B1 | 10/1995 |
| EP | 0 898 645 B1 | 3/1999 |

OTHER PUBLICATIONS

"Infrared Modules for Industrial Processes", Haraeus Noblelight brochure, Mar. 2002, 8 pages, Germany.

* cited by examiner

Primary Examiner—L. J. Casaregola

(57) ABSTRACT

A heating system for a turbine engine air intake region for preventing the formation of ice on the air intake region, which may be formed from the bell-mouth, one or more vanes, such as inlet guide vanes, a turbine blade assembly formed from one or more blades, such as the first row of rotating blades, and related components. A heat source may be attached to the inlet manifold and positioned to emit thermal radiation toward the air intake region to prevent the formation of ice thereon.

13 Claims, 2 Drawing Sheets

SYSTEM FOR HEATING AN AIR INTAKE OF TURBINE ENGINE

FIELD OF THE INVENTION

This invention is directed generally to systems and methods for preventing icing in turbine engines, and more particularly, to systems and methods for heating an air intake portion of a turbine engine to prevent icing.

BACKGROUND

Turbine engines generate power that is used for a variety of purposes. Society's ever increasing demands for power have led the turbine industry to increase output of the turbine engines. One such manner in which the output of turbine engines has been increased has been by lowering the inlet temperature of air flowing into the turbine engine. The reduced air temperature increases the efficiency and power of turbine engines. However, the air temperature is typically reduced through use of evaporative coolers that inject air into the air stream. The moisture laden air often forms ice on the upstream components of the turbine engine, such as, but not limited to, the air intake region, the row one turbine blade, and the row one turbine vanes. The presence of ice on the components causes premature failure of turbine components, and thus, is not desirous.

For instance, vanes and blades in the air intake section of a turbine can experience icing from ambient air and chilled air alike. The chilled air, which is commonly saturated with water vapor, enters a turbine and accelerates to a high velocity. The water vapor transforms to the solid state and freezes on components of the air intake region and components of the blade assembly. Icing of an air inlet structure may also occur when the ambient temperature of in-flowing air is at or above freezing and has a sufficient moisture content.

One anti-icing technique that has been used includes channeling high temperature, high pressure air from the turbine engine compressor to the air inlet region of the turbine engine. Such a technique prevents icing by raising the temperature of the air in the air inlet region. A problem with this technique is that it results in an increase in fuel consumption of the turbine engine and a reduced power output. In one estimation, 2.5% to 3% percent of the total airflow is needed to raise the temperature of the air in the inlet region sufficiently to avoid icing. This amount of compressor bleed air has been estimated to reduce the turbine engine's power output by approximately 7%, which approximates to over 12,000,000 Watts. Thus, a need exists to prevent icing of the turbine without detracting from the power produced by the turbine.

SUMMARY OF THE INVENTION

This invention is directed to a heating system for heating an air intake region of a turbine engine to prevent ice from forming on the components of the air intake region, which may include, but is not limited to, a bell-mouth, turbine vanes, and a turbine blade assembly formed from one or more blades, and other related components. The heating system prevents ice formation on turbine components of the air intake region when air entering the turbine is highly saturated with water or is at or below freezing temperatures. The heating system may also be used in other conditions, such as low load conditions, when the likelihood of icing may be increased.

The heating system may be formed from heat sources positioned on an inlet guide manifold, including its conical section, to emit thermal radiation to various components of the air intake region. The heat sources may be located remote from the components to be heated, in contrast to embedding heating elements within or attaching heating elements to the components to be heated. Additionally, the heat sources may be positioned along the manifold and conical section in any formation, such as circumferentially around the inlet manifold and circumferentially around the conical section. Other formations for providing a non-uniform transmission of thermal radiation may be used when beneficial. Also, the heat sources may be embedded within recesses as to not affect the aerodynamics of the air intake.

The heat sources may be any suitable heat source, such as an infrared lamp. The level and intensity of thermal radiation provided by the heat source is not limited as multiple heat sources, such as a bank of infrared lamps or multiple banks of infrared lamps, may be used to provide the requisite thermal transmission.

During operation, air flows into the turbine engine through the air intake region. The heat sources are positioned in the turbine engine to emit thermal radiation towards the air intake region to prevent the formation of ice thereon. Radiation is emitted from the heat sources and contacts the components of the air intake region, thereby increasing the temperature of the components of the air intake region and preventing the formation of ice thereon.

An advantage of this invention is that the incoming air can be cooled or saturated with water to increase the efficiency of the turbine engine without allowing ice to form on parts of the turbine engine.

Another advantage of this invention is that the heat sources may be affixed in recesses, which may allow for easy access during maintenance.

These and other embodiments are described in more detail below.

BRIEF DESCRIPTION OF THE DRAWINGS

The accompanying drawings, which are incorporated in and form a part of the specification, illustrate embodiments of the presently disclosed invention and, together with the description, disclose the principles of the invention.

DETAILED DESCRIPTION OF THE INVENTION

Figure 1:
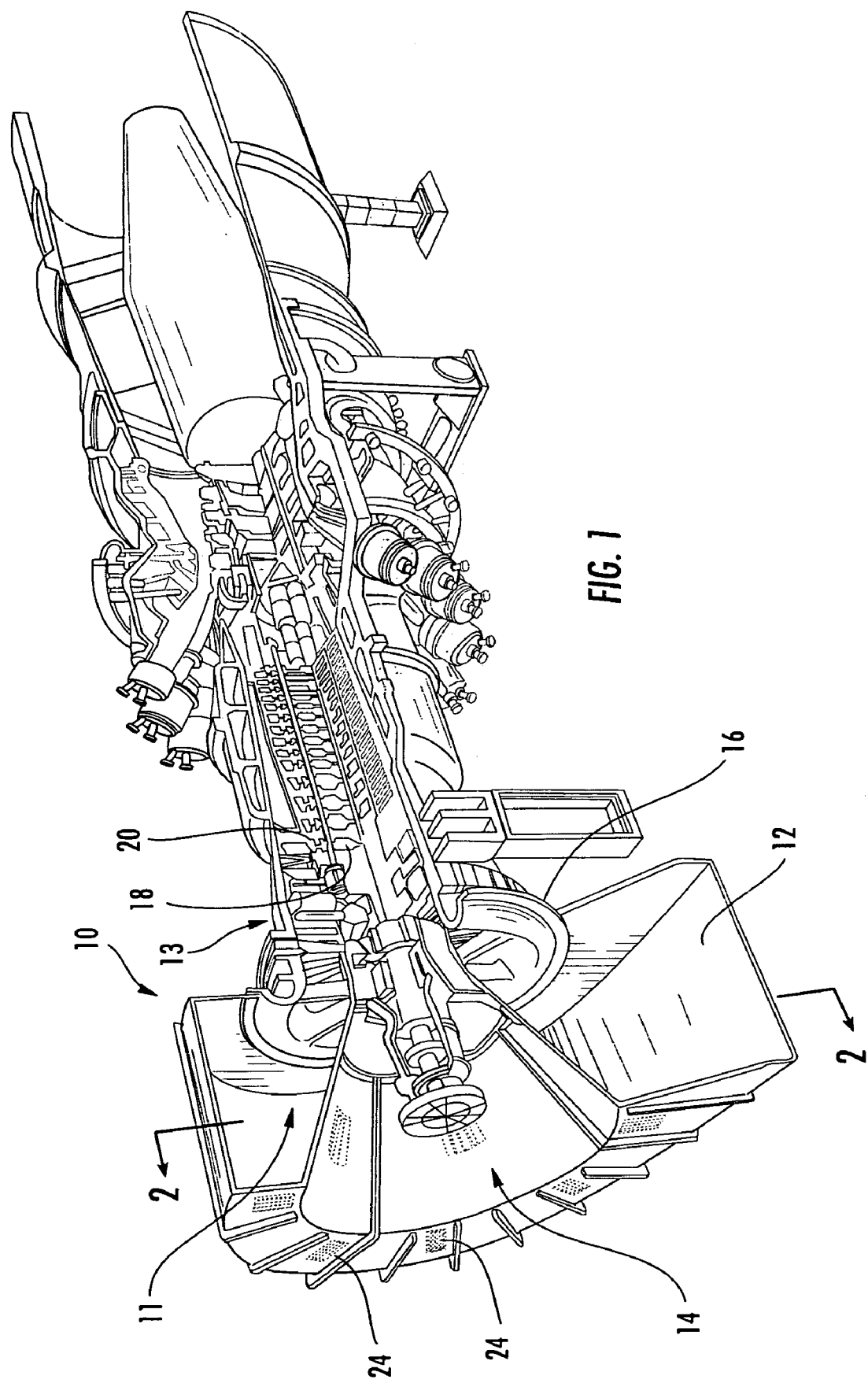
FIG. 1 is a partial cross-sectional view of a turbine engine according to aspects of the invention.
Figure 2:
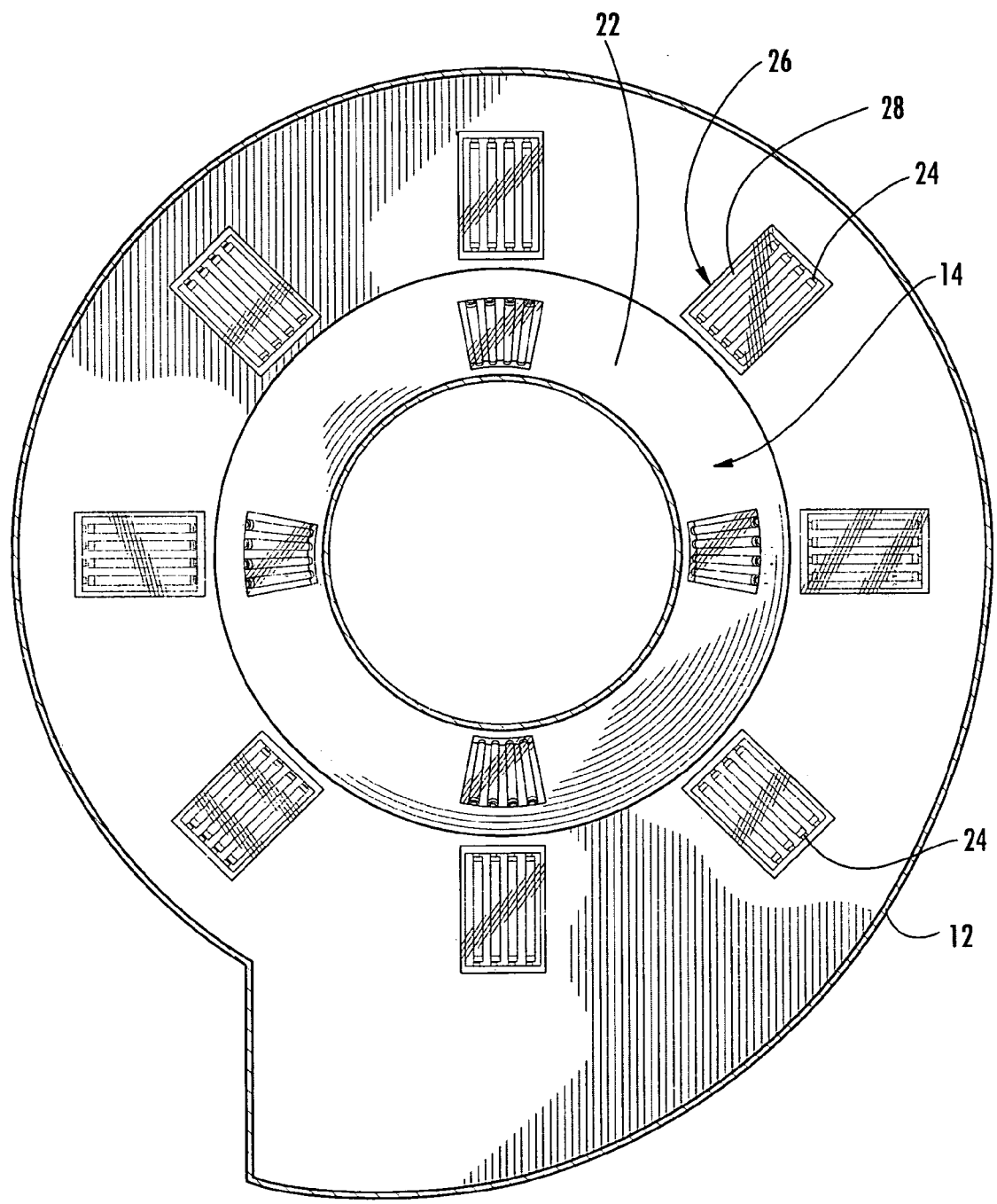
FIG. 2 is a cross-sectional view of the turbine engine of FIG. 1 taken along line 2—2.

This invention is directed to a heating system 10 for a turbine engine air intake used in turbine engines. In particular, as shown in FIGS. 1–2, the invention is directed to heating system 10 located at the turbine engine inlet manifold 12. The heating system 10 maybe formed from one or more heat sources 24 positioned to emit infrared radiation, or other radiation, towards an air intake region 11 of a turbine engine. In at least one embodiment, the air intake region 11 may be formed from the bell-mouth 16, one or more vanes, such as inlet guide vanes 18, and a compressor blade assembly 13 formed from one or more blades, such as the first row of rotating blades 20, and other related components.

In at least one embodiment, as shown in FIG. 1, the turbine engine inlet manifold 12 may include a conical section 14, which provides a surface 22 of the inlet manifold 12 that converges and dncts air in the direction of a bell-mouth 16. The inlet manifold 12 and the conical section 14 may be arranged to duct air toward the convergence of the conical section 14. In such an arrangement, air flows in the direction of and into the air intake region 11 of the commpressor blade assembly 13 for use during the turbine power production process.

The heat sources 24 may be positioned to emit thermal radiation towards the air intake region 11 of the turbine engine. The heat sources 24 may be positioned remote from the heated components of the air intake region 11, as compared to embedding heating elements within or attaching heating elements to the components to be heated. In at least one example, infrared lamps may be positioned approximately four to seven feet from the air intake region 11; however, the distances can vary depending upon the heat sources and the amount of heat required. Further, the heat sources 24 may emit thermal radiation towards the components individually or in combination. For instance, a particular infrared lamp may be positioned to direct a concentrated transmission of thermal energy towards a particular air intake region 11 component or to multiple components.

The heat sources 24 may be positioned along the manifold 12 and the conical section 14 in any formation. In at least one embodiment, the heat sources 24 may be positioned circumferentially around the inlet manifold 12 and circumferentially around the conical section 14. Such positioning may produce an array of heat sources 24 that are generally uniformly spaced apart from each other, thereby providing a generally uniform concentration of thermal radiation, rather than varied concentrations of thermal radiation. Nevertheless, in some instances, non-uniform concentrations of heat radiation may be desired to prevent icing on parts particularly susceptible to icing, and therefore, the heat sources 24 may be positioned as to provide such an affect.

The heat sources 24 may be affixed to the inlet manifold 12, including along the conical section 14, with any suitable fixation device, such as bolts, screws, rivets, adhesives, and the like. In at least one embodiment, as shown in FIG. 2, the heat sources 24 may be embedded in recesses 26 provided by the manifold 12 and the conical section 14. The heat sources may be protected with a cover 28, which may be formed of glass or other material allowing for optimal thermal transmission. The heat sources 24 may be recessed within the inlet manifold 12, thereby not affecting the aerodynamics of the inlet manifold 12.

The heat sources 24 may be any heat source for providing a suitable amount of thermal radiation to heat at least a portion of the air intake region 11 to prevent ice from forming. In at least one embodiment, the heat sources 24, which may be, but are not limited to, infrared lamps, may emit a concentrated, as opposed to scattered, transmission of thermal radiation toward the air intake region 11.

The temperature to which the air intake region 11 may be heated to prevent formation of ice may be determined by calculating a recovery factor corrected temperature, which is a temperature adjusted for temperature variations produced by air flow. Icing is prevented if the air intake region 11 has a recovery factor corrected temperature greater than 32° F.

In addition to preventing temperatures at which icing may occur, the amount of thermal radiation required may be dependent upon a variety of factors, including the values of thermal radiation absorptivity of the components to be heated and the losses from radiation diffusion. In one example, the convective heat transfer coefficient of the air may approximate 250. Watts/(square meters)(Celsius), the components of the compressor blade assembly 13 may have an absorptivity similar to that of stainless steel of approximately 0.5, and the diffusion losses may approximate 50%. In such an example, 16 infrared lamps, each operating at 5,000 watts and having a size of 1.7 sq. ft. at 20 Wattsl (square inches), may be used in combination to operate cumulatively at an output of 80,000 watts of thermal radiation emitted towards the air intake region 11 of the compressor blade assembly 13. Nevertheless, the amount of thermal radiation suitable for turbine engines may be between approximately 50,000 watts and about 150,000 watts, depending upon the amount of energy lost to diffusion and upon the absorptivity of the material to be heated. The thermal radiation may supply, in addition to heating the air intake region 11 sufficiently, enough latent heat to prevent super-cooling of water droplets in the air passing through the compressor blade assembly 13.

The level and intensity of thermal radiation provided by each heat source 24 is not limited to a specific range. In at least one embodiment, multiple heat sources 24, such as a bank of infrared lamps or multiple banks of infrared lamps, may be used to provide the suitable amount of thermal radiation. In other embodiments, infrared lamps of various sizes, operating at other intensities, and other numbers of lamps may be used, depending upon the application, material absorptivity values, and losses due to radiation diffusion. In addition, various heat sources 24, having a wide range of power outputs may be used as uniformity among heat sources 24 is not necessary. The infrared lamps may include halogen infrared lamps with a spectrum in the near-infrared region. Other examples of suitable infrared lamps include short wave infrared lamps, medium wave lamps, and carbon infrared emitters. Such lamps can include a reflective coating or surface for redirecting thermal radiation not directed at the components of the turbine engine.

During operation, air flows into the turbine engine through the air intake region 11. More specifically, air flows into the inlet manifold 12, past the conical section 14, through the bell-mouth 16, and past the inlet guide vane 18 and the rotating blades 20. The air flowing into the air intake region 11, and in particular, air that has undergone evaporative cooling or air at or below the freezing temperature, may cause ice to form on the components of the compressor blade assembly 13 if the heat sources 24 are not used.

The heat sources 24 are positioned to emit thermal radiation towards and heat at least a portion of the air intake region. The heat prevents ice from forming on the components of the air intake region 11. Depending on the mode of turbine operation, air properties, and other factors, the heat sources 24 may provide a uniform or non-uniform thermal radiation.

The foregoing is provided for purposes of illustrating, explaining, and describing embodiments of this invention. Modifications and adaptations to these embodiments will be apparent to those skilled in the art and may be made without departing from the scope or spirit of this invention.

I claim:

1. A heating system for an air intake region of a turbine engine, comprising:
   a turbine engine inlet manifold having a surface for directing air towards the air intake region; and
   a plurality of heat sources affixed to the turbine engine inlet manifold, intermittently spaced circumferentially around the inlet manifold, and the heat sources positioned to emit thermal radiation towards the air intake region;

wherein the heat source emits thermal radiation to heat at least a portion of the air intake region to prevent the formation of ice on components forming the air intake region.

2. The heating system according to claim 1, further including a recess in the inlet manifold in which the heat source is embedded.

3. The heating system according to claim 2, wherein the heat source is an infrared lamp.

4. The heating system according to claim 1, further including a plurality of recesses in the inlet manifold, wherein a heat source is embedded in a recess.

5. The heating system according to claim 4, wherein the plurality of heat sources are positioned circumferentially wound the inlet manifold.

6. The heating system according to claim 5, wherein the plurality of heat sources are infrared lamps.

7. The heating system according to claim 1, wherein the turbine engine inlet manifold has a conical section with a plurality of recesses in which a plurality of heat sources are embedded.

8. The heating system according to claim 7, wherein the heat sources are positioned circumferentially around the conical section.

9. The heating system according to claim 8, wherein the heat sources are infrared lamps.

10. A heating system for an air intake region of a turbine engine, comprising:
    a turbine engine inlet manifold with a conical section converging towards a compressor blade assembly and arranged to direct air toward a convergence region of the conical section;
    a recess in the turbine engine inlet manifold; and
    a heat source embedded in the recess and positioned to emit thermal radiation towards the air intake region;
    wherein the heat source emits thermal radiation to heat at least a portion of the air intake region to prevent the formation of ice on the components of the air intake region.

11. The heating system according to claim 10, wherein the heat sources embedded in the recesses are positioned circumferentially around the conical section.

12. The heating system according to claim 11, wherein the heat sources are infrared lamps.

13. A heating system for an air intake region of a turbine engine, comprising:
    a turbine engine inlet manifold having a surface for directing air towards the air intake region;
    at least one heat source affixed to the turbine engine inlet manifold and positioned to emit thermal radiation towards the air intake region; and
    a recess in the inlet manifold in which the heat source is embedded,
    wherein the heat source emits thermal radiation to heat at least a portion of the air intake region to prevent the formation of ice on components forming the air intake region.

* * * * *